(12) United States Patent
Hamada et al.

(10) Patent No.: US 10,166,526 B2
(45) Date of Patent: Jan. 1, 2019

(54) REACTOR

(71) Applicant: IHI Corporation, Tokyo (JP)

(72) Inventors: Koki Hamada, Tokyo (JP); Hiroyuki Kamata, Tokyo (JP); Takuya Yoshinoya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 198 days.

(21) Appl. No.: 15/014,078

(22) Filed: Feb. 3, 2016

(65) Prior Publication Data

US 2016/0144336 A1 May 26, 2016

Related U.S. Application Data

(63) Continuation of application No. PCT/JP2014/073868, filed on Sep. 10, 2014.

(30) Foreign Application Priority Data

Sep. 13, 2013 (JP) .................................. 2013-190813

(51) Int. Cl.
*B01J 19/24* (2006.01)
*C01B 3/38* (2006.01)
*C01B 3/48* (2006.01)

(52) U.S. Cl.
CPC .............. *B01J 19/249* (2013.01); *C01B 3/38* (2013.01); *C01B 3/48* (2013.01); *B01J 2219/2453* (2013.01); *B01J 2219/2458* (2013.01); *B01J 2219/2462* (2013.01); *B01J 2219/2474* (2013.01); *B01J 2219/2482* (2013.01); *B01J 2219/2496* (2013.01); *B01J 2219/2498* (2013.01); *C01B 2203/0233* (2013.01); *C01B 2203/0283* (2013.01); *C01B 2203/0445* (2013.01)

(58) Field of Classification Search
CPC .............. B01J 19/249; C01B 3/38; C01B 3/48
USPC ........................................... 422/601
See application file for complete search history.

(56) References Cited

U.S. PATENT DOCUMENTS

| | | |
|---|---|---|
| 7,896,935 B2 | 3/2011 | Tonkovich et al. |
| 2004/0228781 A1 | 11/2004 | Tonkovich et al. |
| 2004/0229752 A1 | 11/2004 | Long et al. |
| 2007/0140955 A1 | 6/2007 | Tonkovich et al. |

(Continued)

FOREIGN PATENT DOCUMENTS

| | | |
|---|---|---|
| EP | 2 478 960 A1 | 7/2012 |
| EP | 2 954 949 A1 | 12/2015 |

(Continued)

OTHER PUBLICATIONS

Machine translation of JP-2007275823—Sep. 11, 2017.*

(Continued)

*Primary Examiner* — Huy Tram Nguyen

(57) ABSTRACT

Provided is a reactor in which a catalyst to accelerate reaction of a reactant is allowed to act on a reaction fluid having the reactant. The reactor has a partition that defines, in a parallel form, a plurality of reaction flow passages through which the reaction fluid flows, and a plurality of catalyst structures, each having a catalyst and being respectively provided in each of the plurality of reaction flow passages. The partition has a communicating portion allowing the plurality of reaction flow passages to communicate mutually.

11 Claims, 6 Drawing Sheets

(56) References Cited

U.S. PATENT DOCUMENTS

| | | | |
|---|---|---|---|
| 2008/0031788 A1* | 2/2008 | Brophy | B01J 19/0093 422/207 |
| 2008/0058434 A1 | 3/2008 | Tonkovich et al. | |
| 2010/0280136 A1 | 11/2010 | Tonkovich et al. | |
| 2010/0324158 A1* | 12/2010 | Bowe | B01J 19/249 518/712 |
| 2011/0002818 A1 | 1/2011 | Tonkovich et al. | |

FOREIGN PATENT DOCUMENTS

| | | |
|---|---|---|
| EP | 3 015 164 A1 | 5/2016 |
| JP | 2007-244944 A | 9/2007 |
| JP | 2007-275823 A | 10/2007 |
| JP | 2007-534457 A | 11/2007 |
| JP | 2009-078227 A | 4/2009 |
| JP | 2011-508043 A | 3/2011 |
| JP | 2013-027867 A | 2/2013 |
| WO | 2009/081175 A1 | 7/2009 |

OTHER PUBLICATIONS

Machine translation of JP-2007244944—Sep. 11, 2017.*
USPTO Translation of JP-2007244944—Mar. 2018.*
USPTO Translation of JP-2007275823—Mar. 2018.*
European Patent Office, "Extended European Search Report," issued in European Patent Application No. 14 843 423.6, which is a European counterpart of U.S. Appl. No. 15/014,078, dated Feb. 16, 2017, 9 pages.
Japan Patent Office, "Office Action", issued in Japanese Patent Application No. 2015-536590, dated Jun. 26, 2017, 2 pages.
Japan Patent Office, "Office Action", issued in Japanese Patent Application No. 2015-536590, dated Jul. 4, 2017 (corrected from "Jun. 26, 2017" as indicated in IDS submitted on Jul. 5, 2017), 2 pages.

* cited by examiner

REACTOR

CROSS REFERENCE TO RELATED APPLICATIONS

This application is a continuation application of International Application No. PCT/JP2014/073868, filed on Sep. 10, 2014, which claims priority of Japanese Patent Application No. 2013-190813, filed on Sep. 13, 2013, the entire contents of which are incorporated by reference herein.

BACKGROUND

Technical Field

Embodiments described herein relate to a reactor in which chemical reaction is conducted with use of a reaction fluid which is a fluid containing a reactant, and the reaction is accelerated therewith by the action of a catalyst structure on the reaction fluid.

Description of the Related Art

A reactor is known as a chemical reaction device in which a gaseous or liquid fluid containing a reactant is heated or cooled to promote the reaction of the reactant. Reactors in which the reaction field is a minute space (compact reactors), such as a reactor having a flow passage cross section of the fluid in a size of about several mm on each side, and a micro reactor having a flow passage cross section in a size of less than 1 mm on each side, have a large specific surface area per unit volume. Therefore, they have a high heat transfer efficiency and can improve the reaction rate and the yield. In addition, rapid mixing and control to achieve active concentration distribution are made possible by arbitrarily configuring the convection or diffusion aspect, and therefore the reaction can be precisely controlled.

Such a reactor is configured so that a single inlet passage is branched into a plurality of reaction flow passages (reaction field), and the multiple reaction flow passages branched are united in a single outlet flow passage. In addition, the multiple reaction flow passages are arranged in parallel, and a catalyst is placed in each of the reaction flow passages. Therefore, the reactant contained in the fluid (reaction fluid) introduced into the inlet flow passage becomes the reaction product in the plurality of reaction flow passages due to the progress of the reaction, and the reaction product is discharged to the outside through the outlet flow passage.

As the technology for placing the catalyst in the reaction flow passages, there is disclosed a technology of supporting the catalyst on metal plates having a flat plate shape and installing the metal plates supporting the catalyst over the entire length of the reaction flow passage so that the catalyst is uniformly arranged over the entire area of the reaction flow passage (for example, Publication Document 1).

DOCUMENTS LIST

Publication Document 1: Japanese Patent Application Laid-Open (JP-A) No. 2007-244944 A

BRIEF SUMMARY

In the reactor in which a plurality of reaction flow passages are arranged in parallel as described above, the flow rate distribution (or concentration distribution) dispensed from the inlet flow passage is maintained in each of the reaction flow passages and guided to the outlet flow passage. In this case, if there is a bias in the flow rate distribution from the inlet flow passage, a difference occurs between the reaction efficiency in the reaction flow passage having a relatively large flow rate and the reaction efficiency in the reaction flow passage having a relatively small flow rate. As a consequence, the reaction efficiency of the whole reactor decreases.

In addition, in the reaction flow passage having a relatively large flow rate, the catalytic activity may be lowered or the catalyst may be deteriorated by deposition of carbon (occurrence of coking) on the catalyst surface. In the reaction flow passage where the catalytic activity is lowered, the reaction efficiency is significantly reduced and the use of the reaction flow passage becomes difficult. As a consequence, the reaction efficiency of the whole reactor decreases.

Furthermore, if dust is mixed in the reaction fluid introduced into the inlet flow passage, a part of the reaction flow passage is sometimes closed by the dust. In this case, since the reaction fluid does not flow through the occluded reaction flow passage, this reaction flow passage becomes unusable and the reaction efficiency of the entire reactor decreases.

An object of the present disclosure is to solve such problems, and to provide a reactor capable of suppressing decrease in the reaction efficiency of the reaction fluid in the entire reactor.

In order to solve the above issues, according to an aspect of the present disclosure, the reactor is a reactor in which a catalyst to accelerate reaction of a reactant is allowed to act on a reaction fluid having the reactant, the reactor comprising: a partition that defines, in a parallel form, a plurality of reaction flow passages through which the reaction fluid flows; and a plurality of catalyst structures, each having the catalyst and being respectively provided in each of the plurality of reaction flow passages, wherein the partition has a communicating portion allowing the plurality of reaction flow passages to communicate with each other.

According to the present disclosure, it is made possible to inhibit the reaction efficiency of the reaction fluid from decreasing due to the lowering of local activity or deterioration of the catalyst, and to maintain the usage rate of the catalyst as high as possible, whereby the frequency of the catalyst replacement can be reduced.

DETAILED DESCRIPTION OF EMBODIMENTS

Figure 1A:
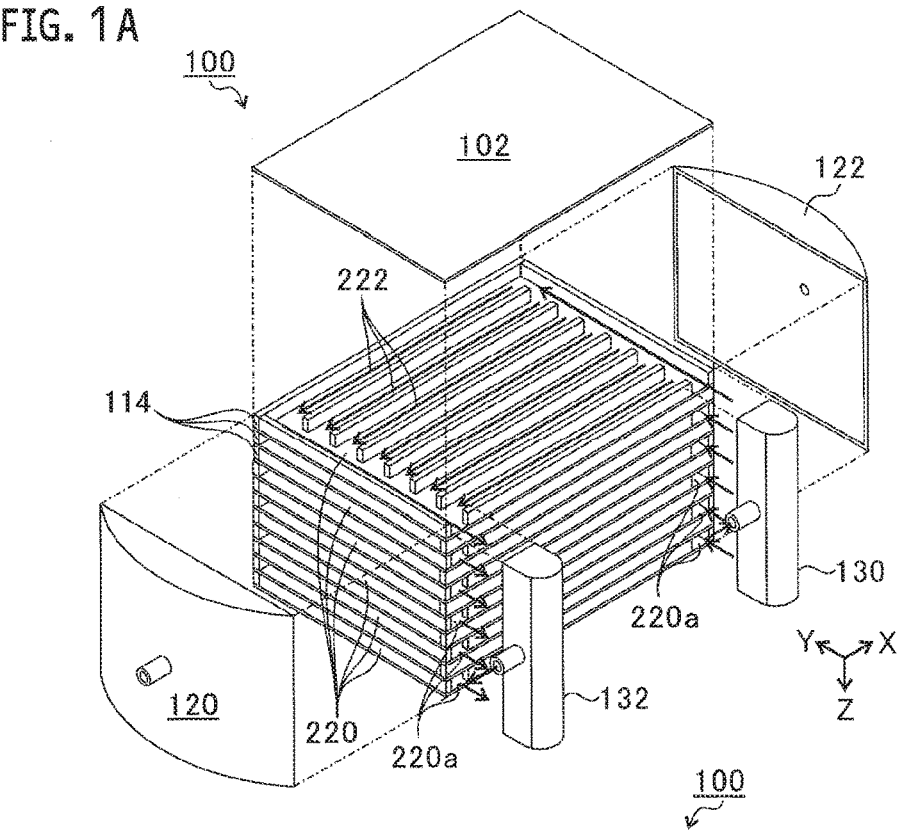
FIGS. 1A and 1B are views for illustrating a basic configuration of a reactor.

The reactor comprises: a partition that defines, in a parallel form, a plurality of reaction flow passages through which a reaction fluid flows; and a plurality of catalyst structures, each having a catalyst and being respectively provided in each of the plurality of reaction flow passages. In the reactor, the catalyst to accelerate reaction of a reactant is allowed to act on the reaction fluid having the reactant, and the partition has a communicating portion allowing the plurality of reaction flow passages to communicate with each other.

The communicating portion of the partition may be arranged so that, in a range from an inlet to an outlet of the reaction flow passage, the plurality of reaction flow passages communicate on the inlet side.

In the reactor, such a configuration is also allowed that the partition includes one or a plurality of partition walls extending along a flow direction of the reaction fluid, that the partition wall is configured to include at least two partial partition walls arranged apart from each other so as to have a gap therebetween, and that the communicating portion of the partition has the gap of the partition wall.

Alternatively, the communicating portion of the partition may have a cutout provided in the partition wall.

Alternatively, the communicating portion of the partition may have a through-hole provided in the partition wall.

Each of the plurality of catalyst structures may include a main body which divides the reaction flow passage along the flow direction of the reaction fluid and defines a plurality of partial flow passages in parallel, and the main body may have a communicating portion allowing the plurality of partial flow passages to communicate with each other in correspondence with the communicating portion of the partition. In this configuration, the main body may be configured to include at least two portions arranged apart from each other so as to have a gap therebetween, and the communicating portion of the main body may have the gap of the main body.

Alternatively, the communicating portion of the main body may have a cutout provided in the main body.

Alternatively, the communicating portion of the main body may have a through-hole provided in the main body.

In addition, such a configuration is also allowed that the main body includes a thin plate material being bent in such a manner to form one or more parallel grooves and ridges, and define each of the plurality of partial flow passages so as to have a rectangular cross section being perpendicular to the flow direction of the reaction fluid, and that the communicating portion of the main body has a cutout provided in at least one of a part forming the groove and a part forming the ridge of the thin plate material.

In the following, the preferred embodiments of the present disclosure will be described in detail with reference to the accompanying drawings. The dimensions, materials, other specific numerical values, and the like shown in these embodiments are only examples to facilitate understanding of the present disclosure, and they are not intended to limit the present disclosure unless otherwise noted. It should be noted that in the present specification and drawings, the elements including substantially the same function and configuration are denoted with the same reference numeral, whereby the redundant description will be omitted, and the elements that are not directly related to the present disclosure are not shown in the drawings.

Figure 1B:
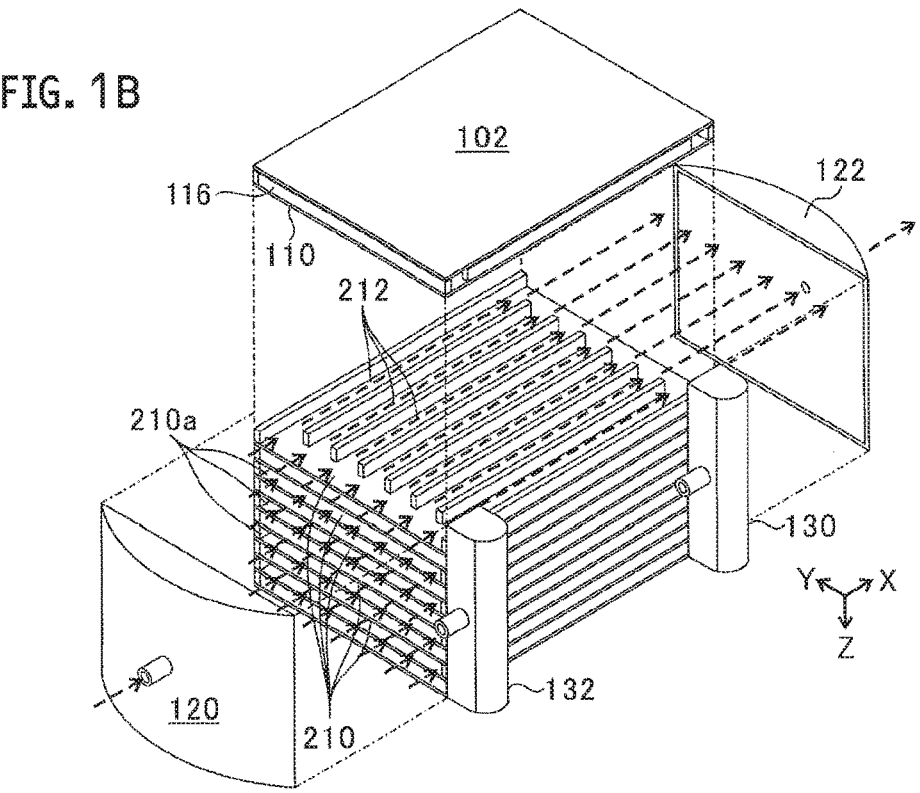
Figure 2A:
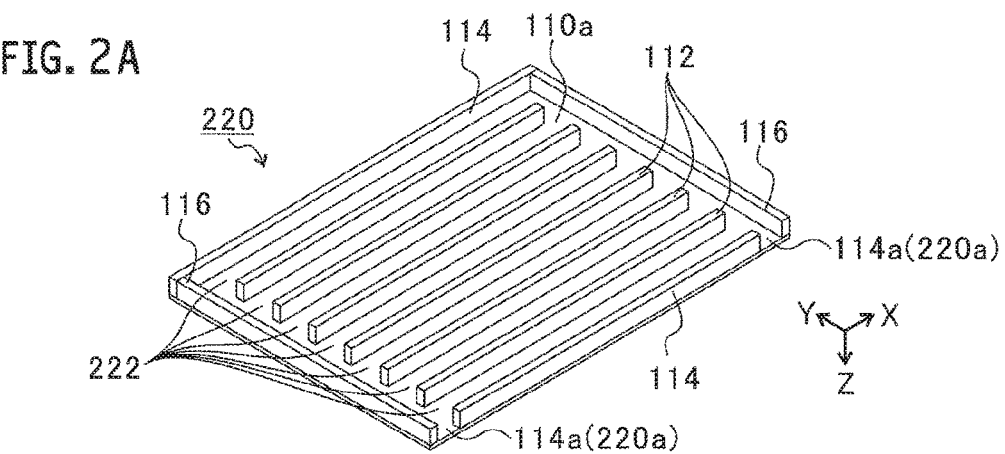
FIGS. 2A to 2C are views for illustrating a reaction flow passage group and a heating medium flow passage group in an embodiment of the reactor according to the present disclosure.
Figure 2B:
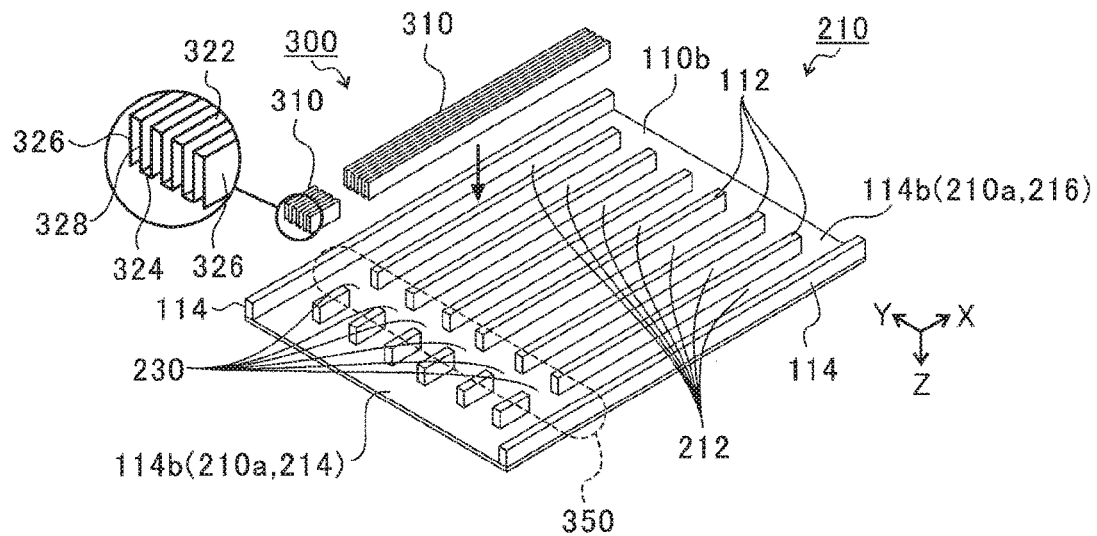
Figure 2C:
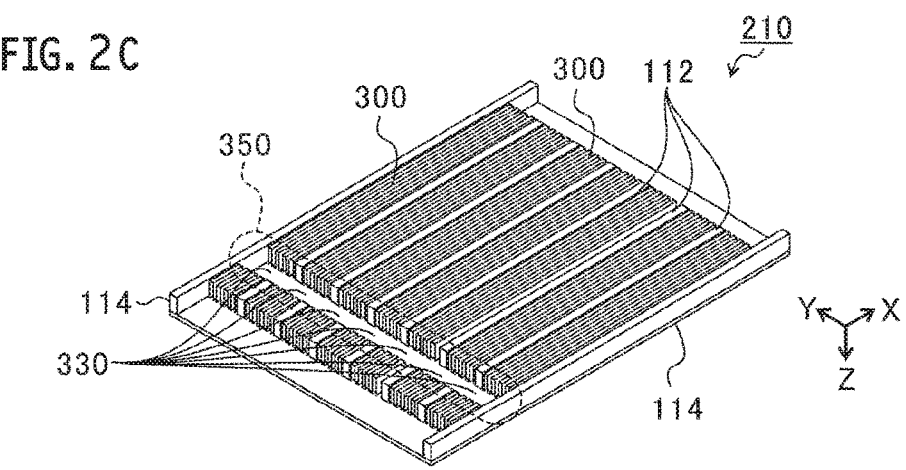

(Reactor 100) FIGS. 1A and 1B are views for illustrating the basic configuration of the reactor, and an embodiment of the reactor of the present disclosure has a configuration obtained by adding improvements as shown in FIGS. 2A to 2C, based on the configuration of the reactor 100 in FIGS. 1A and 1B. In FIGS. 1A and 1B, the X-axis, the Y-axis, and the Z-axis intersecting perpendicularly to one another are, as shown in the drawings, respectively defined as a flow direction of the reaction fluid, a horizontal direction which is perpendicular to the flow direction, and a vertical direction.

As shown in FIGS. 1A and 1B, the reactor 100 has a structure where a plurality of rectangular heat transfer walls 110 (represented by 110a and 110b in FIGS. 2A to 2C and 4A to 6B) are disposed horizontally and stacked in the vertical direction with spacing at predetermined intervals. The reactor 100 includes a top surface 102, side wall plates 114, a reaction fluid introducing portion 120, and a reaction fluid discharge portion 122, and these members form a housing-like structure surrounding the upper and side surfaces so as to enclose the spaces between the stacked heat transfer walls 110 in the inside. Furthermore, a heating medium introducing portion 130 and a heating medium discharge portion 132 are attached on one side surface of the reactor 100 at the side wall plate 114 side. All of the top surface 102, the side wall plates 114, the reaction fluid introducing portion 120, the reaction fluid discharge portion 122, the heating medium introducing portion 130, and the heating medium discharge portion 132 are composed of a metal material (for example, refractory metal such as a stainless steel (SUS310, Haynes (registered trademark) 230), etc.).

The reactor 100 has a stacked structure where a plurality of reaction flow passage groups 210 and a plurality of heating medium flow passage groups 220 are disposed alternately. Specifically, a plurality of parallel layered spaces which are defined between the heat transfer walls 110 stacked at a distance are formed, and the reaction flow passage groups 210 and the heating medium flow passage groups 220 are arranged alternately in these spaces. As shown in FIG. 1A, one heating medium flow passage group 220 includes a plurality of heating medium flow passages 222. In addition, as shown in FIG. 1B, one reaction flow passage group 210 includes a plurality of reaction flow passages 212, and each of the reaction flow passages 212 is provided with a catalyst structure (not shown in FIGS. 1A and 1B), which is described below. It should be noted that, although the partitioned reaction flow passages 212 are described as independent without communicating in the middle in FIG. 1B, an improvement is added in this regard in the present disclosure, and the specific configuration will be described below with reference to FIGS. 2A to 6B.

The reaction fluid introducing portion 120 and the reaction fluid discharge portion 122 have a partial cylinder shape including a side wall curved in a cylindrical circumference shape, and they have spaces for the introduction and the discharge of the reaction fluid, respectively, between themselves and the stacked heat transfer walls 110. At the end on the reaction fluid introducing portion 120 side and at the end on the reaction fluid discharge portion 122 side of the stacked heat transfer walls 110, the layered space where the heating medium flow passage group 220 is arranged is closed by closing plates 116, while the layered space where the reaction flow passage group 210 is arranged has holes 210a formed so as to release. Therefore, the reaction flow passage group 210 communicates with the inner spaces of the reaction fluid introducing portion 120 and the reaction fluid discharge portion 122 through the holes 210a.

In addition, the heating medium introducing portion 130 and the heating medium discharge portion 132 have a hollow structure with a vertical opening on the side, and the heating medium is supplied to and recovered from the reactor 100 through the hollow parts of the heating medium introducing portion 130 and the heating medium discharge portion 132. To this end, the side wall plates 114 on the side where the heating medium introducing portion 130 and the heating medium discharge portion 132 are provided are set to be shorter in every other layer so as to be deficient in both ends, and holes 220a at which the space for the heating medium flow passage group 220 is released are formed at both ends. Therefore, the heating medium flow passage group 220 communicates with the hollow parts of the heating medium introducing portion 130 and the heating medium discharge portion 132 through the holes 220a.

To produce the reactor 100 as described above, the heat transfer walls 110 which have one of the reaction flow passage group 210 and the heating medium flow passage group 220 formed thereon are stacked alternately; the heat transfer walls 110 are joined to each other with the side wall plates 114 and the closing plates 116 interposed therebetween; and the top surface 102 is joined to the upper part of the stacked heat transfer walls 110. Then, each of the reaction fluid introducing portion 120, reaction fluid discharge portion 122, heating medium introducing portion 130, and the heating medium discharge portion 132 is joined to the stacked heat transfer walls 110, whereby the reactor 100 is assembled. There is no limitation on the joining method used when producing the reactor 100, and, for example, TIG (Tungsten Inert Gas) welding or diffusion bonding can be used.

In the above-described configuration of the reactor 100, when the heating medium is introduced from the heating medium introducing portion 130, the heating medium is discharged from the heating medium discharge portion 132 after flowing through the heating medium flow passage group 220, as indicated by the solid line arrows in FIG. 1A. In addition, when the reaction fluid (fluid having a reactant) is introduced from the reaction fluid introducing portion 120, the reaction fluid flows through the reaction flow passage group 210 and is discharged from the reaction fluid discharge portion 122, as indicated by the broken line arrows in FIG. 1B. It is noted that, as shown in FIGS. 1A and 1B, the reaction fluid flowing through the reaction flow passage group 210 and the heating medium flowing through the heating medium flow passage group 220 have a counter-flow relation in the present embodiment.

Thus, the reaction flow passage group 210 and the heating medium flow passage group 220 are partitioned by the heat transfer wall 110 and, therefore, the heating medium flowing through the heating medium flow passage group 220 exchanges heat with the reaction fluid flowing through the reaction flow passage group 210, through the heat transfer wall 110. The temperature of the heating medium is adjusted so that the heating medium of the heating medium flow passage group 220 supplies heat to (heats) the reaction fluid flowing through the reaction flow passage group 210 when performing an endothermic reaction in the reaction flow passage group 210, and that the heating medium of the heating medium flow passage group 220 removes heat from (cools) the reaction fluid flowing through the reaction flow passage group 210 when performing an exothermic reaction in the reaction flow passage group 210.

Examples of the endothermic reaction include the steam-reforming reaction of methane shown in the following chemical formula (1) and the dry-reforming reaction of methane shown in the chemical formula (2).

$CH_4+H_2O \rightarrow 3H_2+CO$ \hfill Chemical formula (1)

$CH_4+CO_2 \rightarrow 2H_2+2CO$ \hfill Chemical formula (2)

In addition, examples of the exothermic reaction include the shift reaction shown in the following chemical formula (3), the methanation reaction shown in the chemical formula (4), and the FT (Fischer Tropsch) synthesis reaction shown in the chemical formula (5).

$CO+H_2O \rightarrow CO_2+H_2$ \hfill Chemical formula (3)

$CO+3H_2 \rightarrow CH_4+H_2O$ \hfill Chemical formula (4)

$(2n+1)H_2+nCO \rightarrow C_nH_{2n+2}+nH_2O$ \hfill Chemical formula (5)

As the reaction fluid to be supplied to the reaction flow passage group 210 of the reactor, a fluid having a composition with a substance (i.e., the reactant) that participates in the chemical reaction performed in the reactor as exemplified by the above-described chemical formulae, or a fluid having a composition with the reactant and a gaseous carrier that does not participate in the reaction can be suitably used. For the gaseous carrier, an appropriate material can be selected from the inert gases and the less reactive gaseous materials (at a temperature in the reactor), in consideration of the chemical reaction to be performed.

In the present disclosure, as the heating medium to be supplied to the heating medium flow passage group 220, a gaseous material that does not corrode the constituent material of the reactor can be suitably used. A configuration in which a gaseous substance is used as the heating medium is easy to be handled as compared with that in which a liquid medium is used.

Thus, in the reactor 100, the reaction flow passage group 210 (reaction flow passages 212) to be the reaction field and the heating medium flow passage group 220 (heating medium flow passages 222) where the heating medium flows are arranged in parallel, with the heat transfer wall 110 interposed therebetween. And the reactor 100 is configured so that the reaction fluid flowing through the reaction flow passage group 210 and the heating medium flowing through the heating medium flow passage group 220 are allowed to perform the heat exchange. As a result, the reaction of the reaction fluid (endothermic reaction or exothermic reaction) can be performed efficiently in the reaction flow passage group 210.

(Reaction Flow Passage Group 210 and Heating Medium Flow Passage Group 220)

Next, a specific configuration of the reaction flow passage group 210 and the heating medium flow passage group 220 in the reactor of the present disclosure will be described with reference to FIGS. 2A to 2C. FIG. 2A shows one heating medium flow passage group 220, FIG. 2B shows one reaction flow passage group 210, and FIG. 2C shows the reaction flow passage group 210 into which the catalyst structures 300 are loaded. In FIGS. 2A to 2C, in order to facilitate understanding of the distinction between the heating medium flow passage group 220 and the reaction flow passage group 210, the heat transfer wall 110 in FIGS. 1A and 1B will be described with distinction between the heat transfer wall 110a and the heat transfer wall 110b. In addition, in order to illustrate the loading of the catalyst structure 300 into the reaction flow passage group 210, one catalyst structure 300 is drawn in FIG. 2B. The definitions of the X-axis, the Y-axis, and the Z-axis in FIGS. 2A to 2C are the same as those shown in FIGS. 1A and 1B, and these definitions are also the same in FIGS. 4A to 6B described below.

As shown in FIG. 2A, each of the heating medium flow passage groups 220 has a bottom surface defined by the heat transfer wall 110a, and the upper surface of the heating medium flow passage group 220 is defined by the top surface 102 or the heat transfer wall 110b. At the four ends of the heat transfer wall 110a, two side wall plates 114 constituting the side walls of the reactor 100 and a pair of closing plates 116 for blocking the reaction fluid introducing portion 120 side and the reaction fluid discharge portion 122 side of the heating medium flow passage group 220 are erected. Therefore, the reaction fluid introduced from the reaction fluid introducing portion 120 is prevented by the closing plate 116 from being incorporated in the heating medium flow passage group 220. In the reactor 100, a partition for defining the heating medium flow passages 222 by dividing the layered space between the heat transfer walls 110a and 110b into a plurality of spaces in parallel is provided on the heat transfer wall 110a. Specifically, in this embodiment, the partition includes six parallel partition walls 112 arranged in each of the layered spaces. The six partition walls 112 are erected on the heat transfer wall 110a to define seven heating medium flow passages 222 between the side wall plates 114, and they hold the spacing between the heat transfer walls 110a and 110b by supporting the heat transfer wall 110b at the upper surface.

In addition, of the two side wall plates 114, the side wall plate 114 on the side where the heating medium introducing portion 130 and the heating medium discharge portion 132 are joined is set shorter than the heat transfer wall 110a so that deficiencies 114a are made at the both ends. When the heat transfer walls 110a and 110b are stacked, the deficiencies 114a form holes 220a. Therefore, the heating medium introduced from the heating medium introducing portion 130 flows into the heating medium flow passage group 220 through the hole 220a, and flows out to the heating medium discharge portion 132 from the inside of the heating medium flow passage group 220 through the hole 220a. The heating medium flowing into the heating medium flow passage group 220 flows through each of the heating medium flow passages 222. That is, the heating medium branches at one ends of the partition walls 112, flows in parallel between the partition walls 112 and the side wall plates 114 from the heating medium introducing portion 130 side to the heating medium discharge portion 132 side, merges after flowing through the other ends of the partition walls 112, and then flows out from the heating medium flow passage group 220. The partition walls 112 (the partition) are shorter than the side wall plate 114, and the heating medium flow passages 222 constituting the heating medium flow passage group 220 are individually independent and parallel flow passages which are integrated only at both ends.

The configuration of the above-described heating medium flow passage group 220 is the same as the configuration illustrated in FIG. 1A.

On the other hand, as for the reaction flow passage group 210, the bottom surface is defined by the heat transfer walls 110b, and the upper surface of the reaction flow passage group 210 is defined by the heat transfer walls 110a, as shown in FIG. 2B. In the reactor 100, a partition for defining the reaction flow passages 212 in parallel shape by dividing the layered space between the heat transfer walls 110a and 110b into a plurality of spaces in parallel is provided on the heat transfer wall 110b. The partition of the reaction flow passage group 210 includes six parallel partition walls 112 erected on the heat transfer wall 110b, which divide the space between the side wall plates 114 to partition into the seven reaction flow passages 212 and also support the heat transfer wall 110a so as to hold the gap between the heat transfer walls 110a and 110b. The number of the partition walls 112 constituting the partition equals (the number of the reaction flow passages 212 minus 1), and the number of the partition walls 112 partitioning the plurality of reaction flow passages 212 is one or more (this also applies to the partition of the heating medium flow passage group 220). In the embodiment of FIGS. 2A to 2C, each of the partition walls 112 constituting the partition of the reaction flow passage group 210 includes at least two partial partition walls configured by dividing and spacing so as to have at least one gap in the middle. This will be described in detail later.

Unlike the heat transfer wall 110a on which the heating medium flow passage group 220 is arranged, the closing plate 116 is not provided on the heat transfer wall 110b on which the reaction flow passage group 210 is arranged. Therefore, in the state where the heat transfer walls 110a and 110b are stacked, the gap 114b between the heat transfer walls 110a and 110b forms a hole 210a. That is, both ends of the space between the side wall plates 114 are released, and the reaction flow passage group 210 communicates with the inner space of the reaction fluid introducing portion 120 and the inner space of the reaction fluid discharge portion 122. Therefore, the reaction fluid supplied from the reaction fluid introducing portion 120 is introduced through the hole 210a (inlet 214) into the reaction flow passage group 210 where the reaction proceeds, and the reaction fluid in which the reaction product is produced is discharged from the reaction flow passage group 210 to the outside of the reaction fluid discharge portion 122 through the hole 210a (outlet 216). The reaction fluid flowing into the reaction flow passage group 210 flows through each of the reaction flow passages 212. That is, the reaction fluid branches at one ends of the partition walls 112, flows in parallel between the partition walls 112 and the side wall plates 114 from the reaction fluid introducing portion 120 side to the reaction fluid discharge portion 122 side, and merges after flowing through the other ends of the partition walls 112. Then it flows out of the reaction flow passage group 210. The partition walls 112 (partition) are shorter than the side wall plate 114, and the reaction flow passages 212 constituting the reaction flow passage group 210 are parallel flow passages which are individually independent by the partition walls 112 and integrated at both ends. However, a communicating portion 350 to locally communicate the reaction flow passages 212 with one another in the course of these reaction flow passages 212 is provided in the partition. This will be described in the following.

In the embodiment of FIG. 2B, each of the partition walls 112 defining the reaction flow passages 212 is constituted by a plurality of (here, two) divided partial partition walls, and these are provided in a line along the flow direction (X-axis direction in FIGS. 2B and 2C) of the reaction fluid and also disposed with a spacing apart so that a gap 230 is formed between them. Therefore, the adjacent reaction flow passages 212 communicate with each other in the gap 230 of the partition wall 112. The positions of the gaps 230 in the six partition walls 112 are arranged in a line in the direction perpendicular to the flow direction of the reaction fluid (Y-axis direction). The communicating portion 350 of the partition is configured by these gaps 230, and the reaction flow passages 212 communicate with each other in the communicating portion 350. Thus, although the mutual flow between the reaction flow passages 212 occurs locally by the communicating portion 350 being provided in the reaction flow passage group 210, the separation and independence of each of the reaction flow passages 212 by the partition walls 112 is maintained in the portion other than the communicating portion 350. The position of the communicating portion 350 is arranged so that the reaction flow passages 212 communicate with each other on the inlet 214 side in the range from the inlet 214 to the outlet 216 of the reaction flow passages 212. More specifically, the gaps 230 are arranged in a location closer to the inlet side branch points than to the outlet side branch points of the reaction flow passages 212 within the range where the reaction fluid branches to flow. The function of the communicating portion 350 will be described below.

As shown in FIGS. 2B and 2C, a catalyst structure 300 having the catalyst for accelerating the reaction of the reaction fluid is placed in each of the reaction flow passages 212. In the catalyst structure 300, the catalyst is supported on the surface of the main body 310, and the reaction fluid comes into contact with the catalyst structure 300, whereby the chemical reaction of the reactant is accelerated by the catalyst on the surface of the main body 310. The main body 310 is made of a metal thin plate material bent in a corrugated shape so as to form one or more parallel grooves and ridges. In a state where the catalyst structure 300 is loaded into the reaction flow passage 212, the main body 310 divides the reaction flow passage 212 along the flow direction of the reaction fluid to define a plurality of partial flow passages in parallel. Specifically, the main body 310 includes top portions 322 (raised upper surface portions) along the heat transfer wall 110a, bottom portions 324 (depressed bottom surface portions) along the heat transfer wall 110b, side wall portions 326 along the partition walls 112, and partition wall portions 328 parallel to the partition walls 112, connecting the top portions 322 and the bottom portions 324 alternately, and the side wall portions 326 are positioned at both ends thereof. Each of these portions extends along the flow direction of the reaction fluid and is provided with the same length as the partition walls 112. In a state where the catalyst structure 300 is loaded in the reaction flow passage 212, the partition wall portions 328 of the main body 310 divide the reaction flow passage 212 into a plurality of partial flow passages in parallel that have a rectangular (long square in this embodiment) cross section perpendicular to the flow direction of the reaction fluid, and the width of the partial flow passage (Y-axis direction) corresponds to the width of the top portion 322 or the bottom portion 324.

This main body 310 is obtained by subjecting a thin plate material having the same length as the partition wall 112 to a bending processing to bend perpendicularly, and is formed into the corrugated shape folded as shown in FIG. 2B, for example, by repeating the bending processing from one side of the thin plate material to form each of the above-described portions sequentially. At this time, the number and width (Y-axis direction) of the top portion 322 and the bottom portion 324 are set so that the sum of the width of the top portions 322 and the bottom portions 324 is substantially equal to the width of the reaction flow passage 212, and the widths of the side wall portion 326 and the partition wall portion 328 are configured to be substantially equal to the height (Z-axis direction) of the reaction flow passage 212, whereby the loaded catalyst structure 300 is tightly fixed into the reaction flow passage 212.

For the thin plate material constituting the main body 310, a material suitable for the present disclosure can be appropriately selected from those available and made of refractory metal to utilize, and it is selected from those capable of being subject to the above-described shaping processing and capable of carrying the catalyst thereon. As the refractory metal, there are heat-resistant alloys having one or more kinds of metal such as Fe (iron), Cr (chromium), Al (aluminum), Y (yttrium), Co (cobalt), Ni (nickel), Mg (magnesium), Ti (titanium), Mo (molybdenum), W (tungsten), Nb (niobium), and Ta (tantalum) as the main component, and it is preferable to constitute the main body 310 by using a thin plate material made of heat-resistant alloys such as Fecralloy (registered trademark).

The catalyst includes an active metal as a main component, and is supported on the surface of the main body 310. The active metal constituting the catalyst is appropriately selected, based on the reaction performed in the reactor 100, so as to be suitable for acceleration of the reaction. As the active metal, Ni (nickel), Co (cobalt), Fe (iron), Pt (platinum), Ru (ruthenium), Rh (rhodium), Pd (palladium), and the like are given by way of example, and one kind or plural kinds in combination as long as it is effective for the reaction acceleration may be used from these metals. In order to satisfactorily load the catalyst on the main body 310, if necessary, the surface of the main body 310 can be subjected to a treatment to provide a layer of a carrier thereon. The loading method of the catalyst can be performed by using existing techniques, and a suitable method may be appropriately selected from well-known techniques depending on the catalyst to be used. The carrier is appropriately selected from those having durability without inhibiting performance of the reaction, in consideration of the reaction performed in the reactor 100. Examples of the carrier include metal oxides such as $Al_2O_3$ (alumina), $TiO_2$ (titania), $ZrO_2$ (zirconia), $CeO_2$ (ceria), and $SiO_2$ (silica), and one or more kinds may be selected for use.

In the embodiment shown in FIGS. 2B and 2C, the main body 310 of each of the catalyst structures 300 is constituted by a plurality of (here, two) divided partial bodies that are arranged in a line along the flow direction (X-axis direction in FIGS. 2B and 2C) of the reaction fluid. These partial bodies are spaced apart so that the gaps 330 are formed between them, and such a configuration is made that the partial flow passages of the reaction flow passage 212, partitioned by the partition wall portions 328 and the side wall portions 326 of the main body 310, communicate with each other in the gaps 330 between the partial bodies. The seven gaps 330 provided in the seven catalyst structures 300 are aligned in a row in the direction perpendicular to the flow direction of the reaction fluid (Y-axis direction), and the communicating portion of the main bodies 310 are configured by these gaps 330.

In this way, a communicating portion is provided in the main body 310 of the catalyst structure 300, whereby although the mutual flow between the partial flow passages in each of the reaction flow passages 212 and the flow between the reaction flow passage 212 and the outside occur locally, each of the partial flow passages is independent in the portion other than the communicating portion. It is provided so that the position and the length in the flow direction (X-axis direction) of the gap 330 of the main body 310 substantially match those of the gap 230 of the partition wall 112. That is, the communicating portion of the main body 310 is arranged in correspondence with the communicating portion 350 of the partition so that the partial flow passages and the gap 230 (communicating portion of the partition) communicate with each other. Therefore, the communicating portion of the main body 310 and the communicating portion 350 of the partition are arranged so as to penetrate the reaction flow passage group 210 on the straight.

Thus, the positions of the gaps 230 in the partition walls 112 and the gaps 330 in the main bodies 310 are set so that the gaps 230 and the gaps 330 are connected. As a result, the communicating portion of the main bodies 310 of the catalyst structures 300 is integrated into the communicating portion 350 of the partition. The communication between the reaction flow passages 212 in the communicating portion 350 of the partition is not inhibited by the catalyst structures 300, and sufficient mutual communication can be achieved through the communicating portion of the main bodies 310. Therefore, a plurality of reaction flow passages 212 and the partial flow passages of each of the reaction flow passages 212 favorably communicate with each other.

Figure 3A:
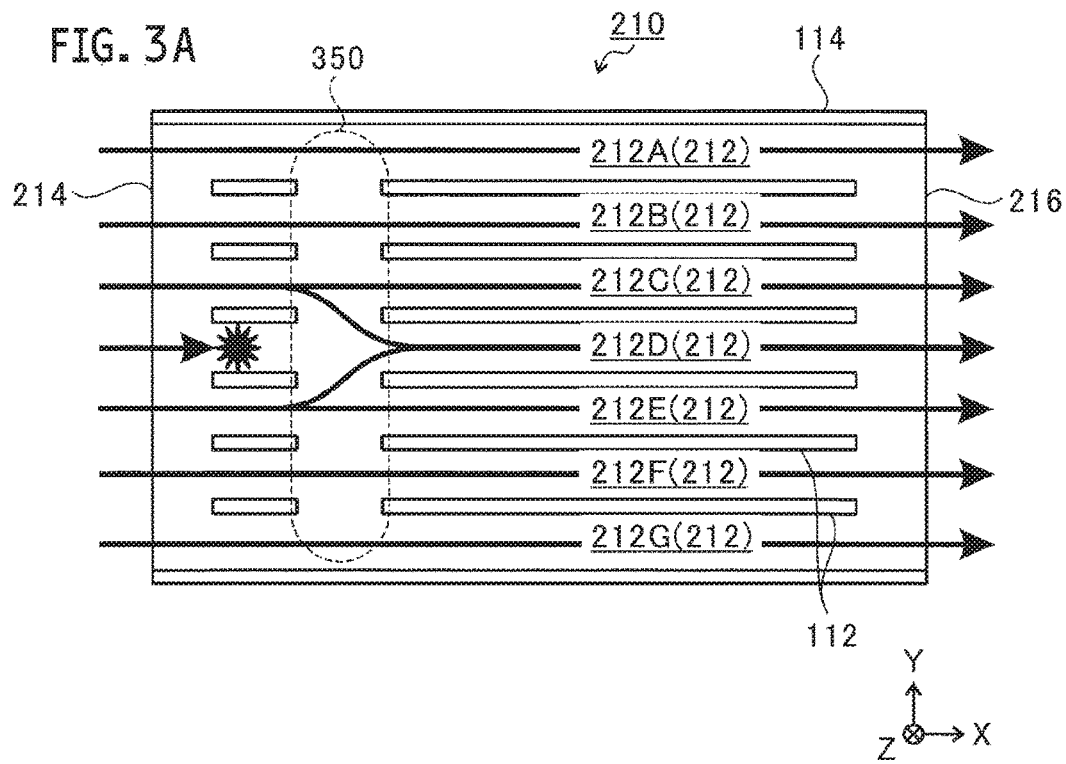
FIGS. 3A and 3B are views for illustrating the function of a communicating portion in the embodiment of FIGS. 2A to 2C.
Figure 3B:
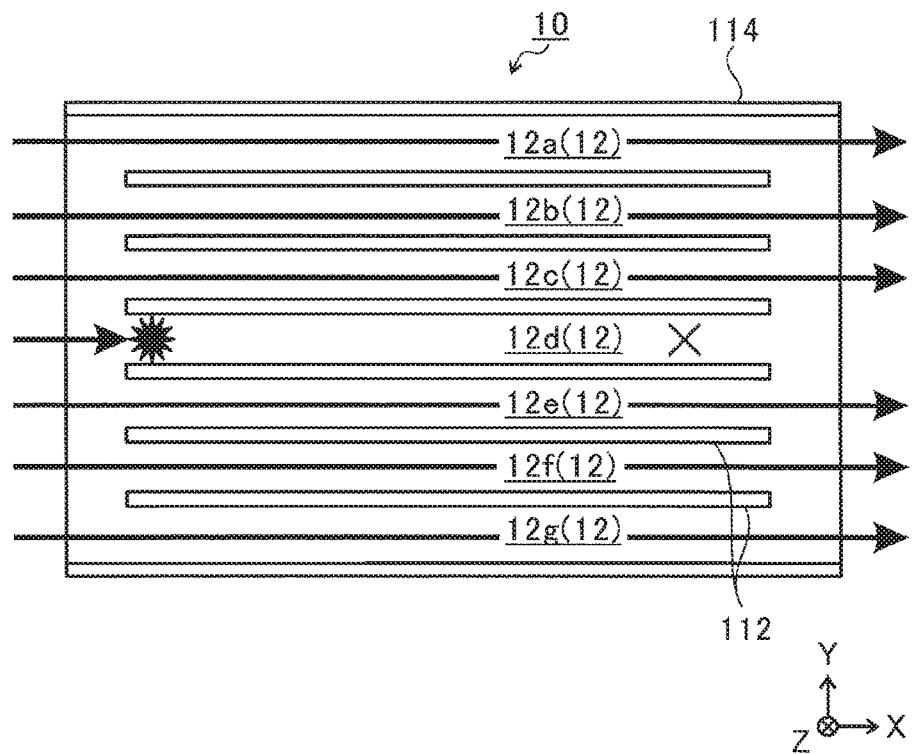

FIGS. 3A and 3B are top views of the reaction flow passage group 210 for illustrating the function of the communicating portion 350, wherein FIG. 3A shows the reaction flow passage group 210 with the communicating portion 350, and FIG. 3B shows, for comparison, the reaction flow passage group 10 without the communicating portion 350. It should be noted that, to facilitate understanding, the description of catalyst structures 300 is omitted in FIGS. 3A and 3B.

As described above, the partition walls 112 are erected on the heat transfer wall 110b to support the heat transfer wall 110a, and are formed so as to isolate the space between the heat transfer walls 110a and 110b (see FIGS. 1A to 2C). Therefore, in the reaction flow passage group 10 in FIG. 3B without the communicating portion 350, the reaction fluid introduced into one of the reaction flow passages 12a to 12g flows through only the introduced reaction flow passage, and is not mixed with the reaction fluid flowing through the other reaction flow passages. For example, the reaction fluid introduced into the reaction flow passage 12a flows through only the reaction flow passage 12a, and the mixing with the reaction fluids of other reaction flow passages 12b, 12c, 12d, 12e, 12f, and 12g does not occur.

Therefore, for example, when the reaction fluid introduced into the reaction flow passage group 10 in FIG. 3B is branched into each of the reaction flow passages 12a to 12g, if there is a bias in the flow rate distribution (or concentration distribution) for each flow passage, a difference occurs between the reaction efficiency of the reaction flow passage 12 having a relatively large flow rate (concentration) and the reaction efficiency of the reaction flow passage 12 having a relatively small flow rate (concentration) due to the difference in the contact efficiency and the like between the reactant and the catalyst, and the reaction efficiency of the whole reactor may easily decrease.

In addition, in the case where there is a bias in the flow rate distribution (or concentration distribution) for each flow passage in the reaction fluid introduced into the reaction flow passage group 10, for example, as shown in FIG. 3B, a relatively large amount of reactant is introduced into the reaction flow passage 12d compared to the other reaction flow passages 12, whereby carbon may easily deposit (coking has occurred) on the surface of the catalyst structure 300 of the reaction flow passage 12d. When carbon deposits on the catalyst structure 300, since the catalyst is easy to cause a decrease in activity and deterioration, the progress of the reaction significantly decreases or the catalyst becomes substantially unusable in the reaction flow passage 12d. As a result, the reaction efficiency of the whole reactor may decrease.

Alternatively, when dust is mixed in the reaction fluid in the configuration shown in FIG. 3B, for example, if the reaction flow passage 12d is closed by the dust, the reaction fluid does not flow in the reaction flow passage 12d, and the reaction flow passage 12d becomes unusable. Therefore, the reaction efficiency of the whole reactor decreases.

In contrast, the reaction flow passage group 210 according to the disclosed technology as shown in FIG. 3A has a communicating portion 350. Therefore, even when there is a bias in the flow rate distribution (concentration distribution) for each flow passage in the reaction fluid to be introduced into the reaction flow passage group 210, the reaction fluid possibly moves from a reaction flow passage 212 having a relatively large flow rate to a reaction flow passage 212 having a relatively small flow rate through the communicating portion 350, whereby the flow rates are equalized. Or, mixing of the reaction fluid is possible between adjacent reaction flow passages, whereby the reactant is diffused and the concentration is made uniform. That is, on the downstream side of the communicating portion 350, the flow rates (concentrations) of a plurality of reaction flow passages 212 can be equalized (made uniform). Therefore, variation of the contact efficiency and the like between the reactant and the catalyst in the reaction flow passage group 210 and decrease in the reaction efficiency due to the ease of occurrence of coking associated therewith are suppressed, and the unused area of the catalyst structure 300 that occurs due to the obstruction by dust or the like can be reduced to a minimum. Therefore, it is possible to suppress a decrease in the reaction efficiency of the whole reactor 100.

Furthermore, the reaction fluid is mixed between the reaction flow passages 212 through the communicating portion 350, whereby it is possible to cause turbulence in the flow of the reaction fluid flowing through the reaction flow passages 212.

Thereby, the mass transfer coefficient from the bulk (the portion not in contact with the catalyst structure 300 and away from the interface, among the reaction fluid) of the reaction fluid flowing through the reaction flow passage 212 to the catalyst surface can be increased, and it is made possible to reduce the diffusion resistance on the catalyst surface. Therefore, the contact efficiency between the reaction fluid and the catalyst can be improved, and improvement in the reaction efficiency is made possible.

In the plurality of reaction flow passages 212, when the flow rate is equalized, that is, when the bias of the flow rate is eliminated, it is possible to suppress the deposition ease of carbon onto the catalyst structure 300. Thus the decrease in activity of the catalyst and the deterioration of the catalyst structure 300 can be suppressed.

In the case where dust is mixed into the reaction fluid, if one of the plurality of reaction flow passages (more specifically, one of the plurality of partial flow passages defined by the main body 310 of the catalyst structure 300) is closed by the dust, the area to be unusable as the reaction field on the downstream side of the closed reaction flow passage is reduced to a minimum in the configuration of FIG. 3A. For example, even if the reaction flow passage 212D is closed by the dust, the reaction fluid flowing through the reaction flow passages 212 other than the reaction flow passage 212D (for example, reaction flow passages 212C and 212E) can flow on the downstream side of the reaction flow passage 212D through the communicating portion 350. That is, even if any one of the reaction flow passages 212A to 212G is closed on the upstream side of the communicating portion 350, all of the reaction flow passages 212A to 212G can be used on the downstream side of the communicating portion 350 as the reaction field. It is thus possible to avoid a situation in which the reaction flow passage 12 closed as in the configuration shown in FIG. 3B becomes unusable over the entire length.

When the dust mixed into the reaction fluid flows into the reaction flow passage 212, the blockage by the dust is considered to be likely to occur on the upstream side of the reaction flow passage 212 (the left side in FIG. 3A), particularly in the vicinity of the inlet side branch point. Therefore, when the benefit of the present disclosure as described above is utilized, it is effective to dispose the communicating portion 350 on the inlet 214 side (upstream side) in the area from the inlet 214 to the outlet 216 of the reaction flow passage 212.

In the communicating portion 350, the reaction fluid is redistributed and equalization of the flow rate on the downstream side can be achieved. Moreover, the diffusion of the reactant can be promoted. Therefore, in the configuration where the communicating portion 350 is arranged on the inlet 214 side and the reaction fluid is redistributed on the upstream side of the reaction flow passages 212, the area where the reaction can be equally performed is increased (that is, in the reaction flow passage 212 where the blockage occurs, the range that the reaction can be performed becomes longer by the redistribution). To reduce as much as possible the area to be unusable by the blockage, it is advisable to examine, in advance, the range having a high frequency of the blockage occurrence and provide the communicating portion 350 on the immediately downstream side of this range so that the communicating portion 350 may be close to the closed place.

In addition, in the embodiment described above, the catalyst structure 300 loaded into the reaction flow passage 212 is configured by using the main body 310 that is divided into two partial bodies. Therefore, when a part of the catalyst structure 300 is closed by dust, or a part of the catalyst structure 300 is deteriorated by coking, only the closed portion or only the deteriorated portion may be replaced, whereby replacement of the entire catalyst structure 300 is avoidable. Consequently, it is possible to minimize the amount of replacing the catalyst structure 300, and the cost required for the performance adjustment and the maintenance of the reactor can be reduced.

In the above embodiment, the communicating portion 350 is configured by the gaps 230 which are formed by dividing the partition walls 112 into a plurality of partial partition walls and placing these with a spacing apart, and the communicating portion communicating between the partial flow passages of the reaction flow passage 212 is configured by the gaps 330 similarly formed for the main body 310 of the catalyst structure 300. With this configuration, in the communicating portion 350, the partial flow passages of all of the reaction flow passages 212 make a communication straight in the direction perpendicular to the flow direction of the reaction fluid (Y-axis direction). That is, the communicating portion 350 is configured as a communicating passage to make a linear communication so as to penetrate the reaction flow passage group 210, and complete mutual distribution between the reaction flow passages 212 can be achieved. However, the communicating portion 350 of the partition and the communicating portion of the main body 310 acting in this way are not limited to the configuration described above, and various modifications are possible. That is, the partition walls 112 and the catalyst structures 300 do not have to be divided into a plurality of portions. In the following, such variations will be described with reference to FIGS. 4A to 6B.

First Modification

Figure 4A:
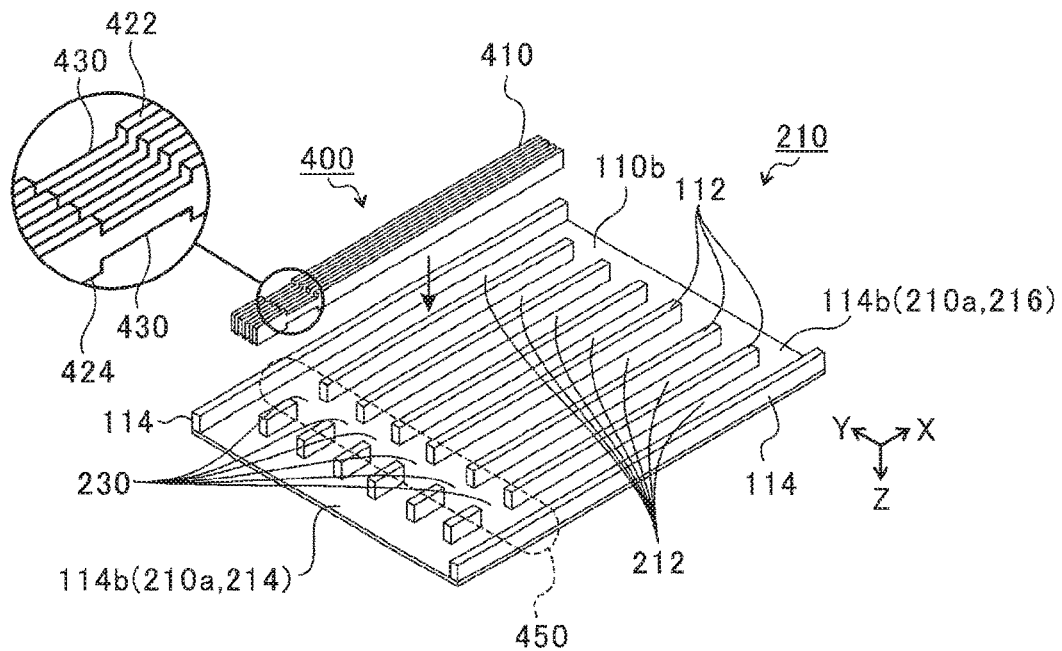
FIGS. 4A and 4B are views for illustrating the configuration of a first modification of the reactor according to the present disclosure.
Figure 4B:
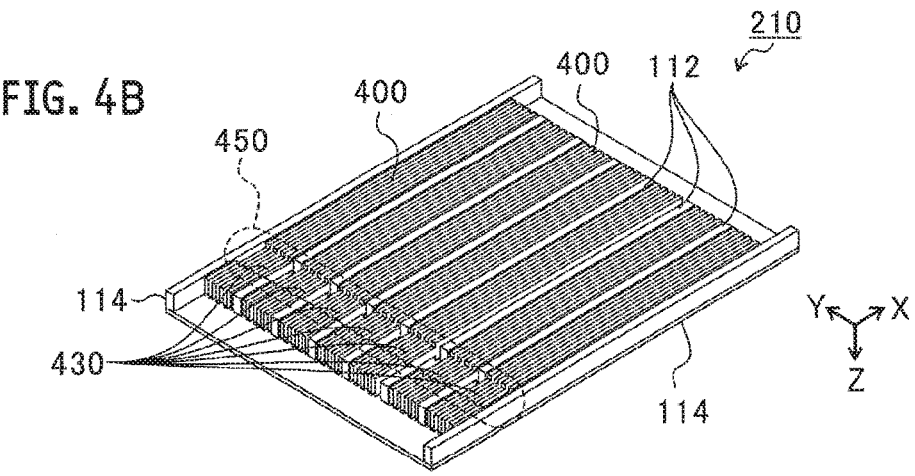

FIGS. 4A and 4B are diagrams for illustrating a first modification of the communicating portion of the reactor according to the present disclosure. FIG. 4A shows one reaction flow passage group 210, and FIG. 4B shows the reaction flow passage group 210 where the catalyst structures 400 are loaded. In FIG. 4A, one catalyst structure 400 is drawn for explanation of the catalyst structures 400 to be loaded into the reaction flow passage group 210.

As shown in FIGS. 4A and 4B, in the first modification, each of the partition walls 112 constituting the partition includes a plurality of (here, two) partial partition walls divided in the same manner as in the embodiment of FIGS. 2A to 2C, and the reaction flow passages 212 constituting the reaction flow passage group 210 are defined by the partition walls 112 in the same manner as in FIGS. 2A to 2C. Therefore, in the same manner as in FIGS. 2A to 2C, the communicating portion 450 of the partition is configured by the gaps 230 of the partition walls 112. However, the catalyst structures 400 are undivided and have respectively cutouts 430 formed in the main body 410 instead of the gap 330 in FIGS. 2A to 2C. Specifically, although the main body 410 is constituted by a thin plate material bent in a corrugated shape in the same manner as the main body 310 in FIGS. 2A to 2C, cutouts 430 with a predetermined depth (Z-axis direction) are formed on the upper side and the lower side of the main body 410, and the top portion 422 (raised upper part) and the bottom portion 424 (depressed bottom part) are locally lost. By these cutouts 430, communicating passages having a rectangular cross-sectional shape are configured on the upper side and the lower side of the main bodies 410 so as to penetrate straight in the direction perpendicular to the flow direction of the reaction fluid (Y-axis direction), and the partial flow passages of the reaction flow passage 212 partitioned by the main body 410 and the outside are locally communicated with each other. The position of the cutouts 430 in the state that the catalyst structure 400 is loaded in the reaction flow passage 212 corresponds to that of the gap 230 of the partition wall 112, and the length of the cutouts 430 in the flow direction (X-axis direction) is substantially the same as that of the gap 230 of the partition wall 112. Therefore, the partial flow passages of the reaction flow passage 212 and the gap 230 of the partition wall 112 communicate with each other through the communicating passages formed by the cutouts 430, and the partial flow passages of all of the reaction flow passages 212, in the communicating portion 450, are communicated straight in the direction (Y-axis direction) perpendicular to the flow direction of the reaction fluid.

Second Modification

Figure 5A:
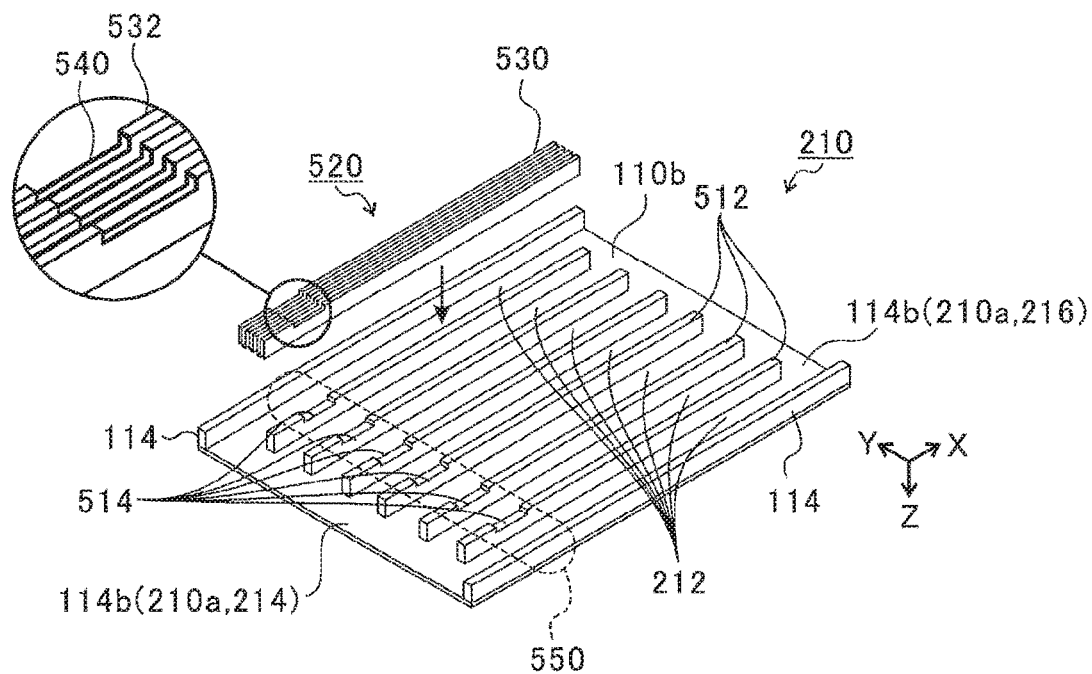
FIGS. 5A and 5B are views for illustrating the configuration of a second modification of the reactor according to the present disclosure.
Figure 5B:
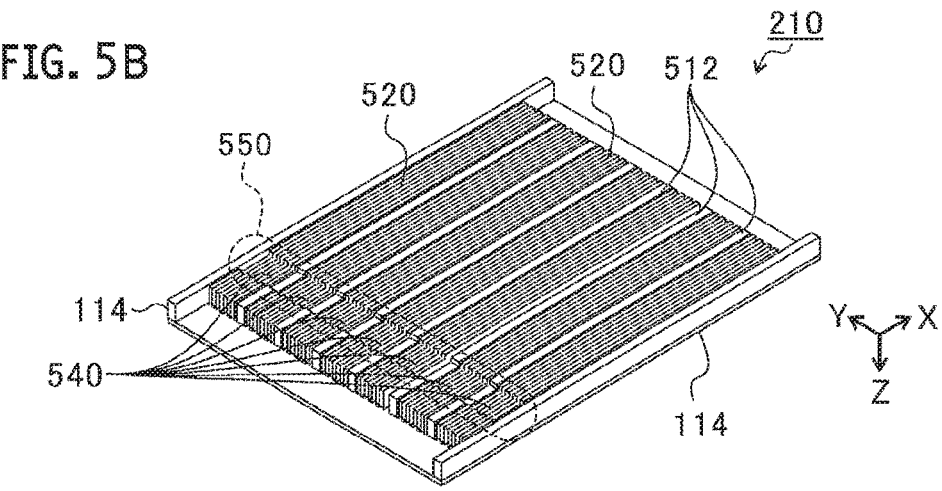

FIGS. 5A and 5B are diagrams for illustrating a second modification of the communicating portion of the reactor according to the present disclosure. FIG. 5A shows one reaction flow passage group 210, and FIG. 5B shows the reaction flow passage group 210 where the catalyst structures 520 are loaded. In FIG. 5A, one catalyst structure 520 is drawn for explanation of the catalyst structures 520 to be loaded into the reaction flow passage group 210.

As shown in FIGS. 5A and 5B, in the second modification, a cutout 540 similar to the cutouts 430 in FIGS. 4A and 4B is formed only on the upper side of the main body 530 constituting the catalyst structure 520. At the same time, each of the partition walls 512 defining the reaction flow passages 212 is undivided and a cutout 514 is formed in each of the partition walls 512. That is, the communicating portion 550 of the partition is constituted by the cutouts 514 formed in the partition walls 512 instead of the gaps 230, and the communicating portion of the main body 530 is constituted by the cutout 540 provided in the main body 530. Specifically, a rectangular cutout 514 is formed on the upper side of the partition wall 512, and although the main body 530 of the catalyst structure 520 is constituted by the thin plate material bent in the corrugated shape as in FIGS. 2A to 2C, a cutout 540 having a predetermined depth is provided on the upper side of the main body 530 so that the top portion 532 (raised upper part) is partially lost. By the cutout 540 of the main bodies 530, the communicating passage having a rectangular cross-sectional shape is configured on the upper side of the main bodies 530 so as to penetrate straight in the direction perpendicular to the flow direction of the reaction fluid (Y-axis direction), and the partial flow passages of the reaction flow passage 212 partitioned by the main body 530 and the outside are locally communicated with each other. In the state where the catalyst structure 520 is loaded into the reaction flow passage 212, the position of the cutout 540 corresponds to that of the cutout 514 of the partition wall 512, and the length of the cutout 540 in the flow direction (X-axis direction) and the depth (Z-axis direction) as well are substantially the same as those of the cutout 514 of the partition wall 512. Therefore, the partial flow passages of the reaction flow passage 212 and the cutout 514 communicate with each other through the communicating passage formed by the cutout 540 of the main body 530.

Thus the communicating portion 550 of the partition and the communicating portion of the main body 530 can also be configured by the cutouts 514 and 540.

Third Modification

Figure 6A:
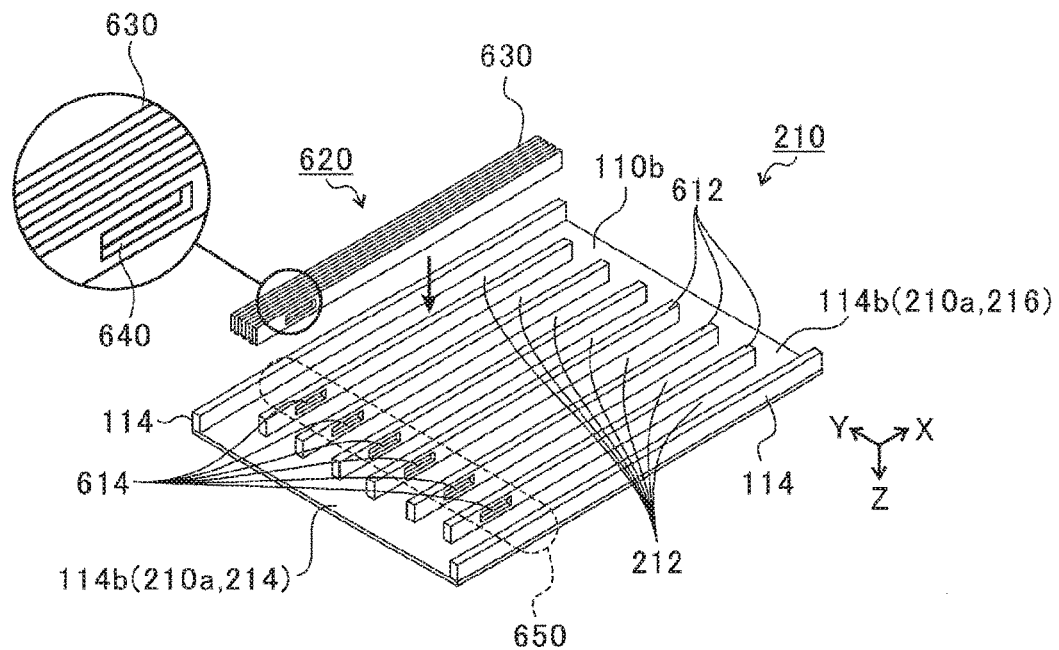
FIGS. 6A and 6B are views for illustrating the configuration of a third modification of the reactor according to the present disclosure.
Figure 6B:
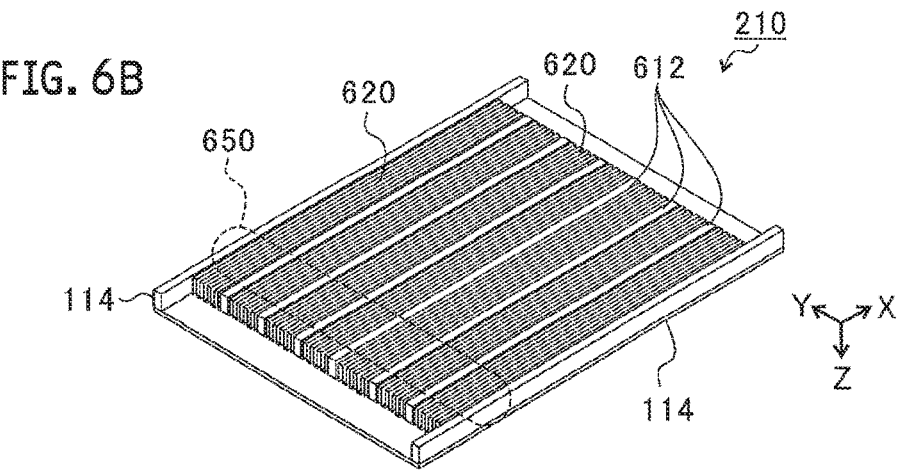

FIGS. 6A and 6B are diagrams for illustrating a third modification of the communicating portion of the reactor according to the present disclosure. FIG. 6A shows one reaction flow passage group 210, and FIG. 6B shows the reaction flow passage group 210 where the catalyst structure 620 is loaded. In FIG. 6A, one catalyst structure 620 is drawn for illustration of the catalyst structure 620 to be loaded into the reaction flow passage group 210.

As shown in FIGS. 6A and 6B, in the third modification, through-holes 614 are provided in the partition walls 612 defining the reaction flow passages 212 in the reaction flow passage group 210, and the communicating portion 650 of the partition is constituted by the through-holes 614 of the partition walls 612. In addition, a through-hole 640 corresponding to the through-hole 614 of the partition wall 612 is also provided in the main body 630 of the catalyst structure 620, and the communicating portion of the main body 630 is constituted by the through-hole 640. Specifically, on the upstream side (inlet 214 side) of each of the partition walls 612, a rectangular through-hole 640 along the central axis is formed, and although the main body 630 of the catalyst structure 620 is constituted by the thin plate material bent into the corrugated shape as in FIGS. 2A to 2C, the rectangular through-hole 640 is formed in the partition wall portions dividing the reaction flow passage 212 into the partial flow passages. By the through-hole 640 of the main bodies 630, the communicating passage having a rectangular cross-section is configured so as to penetrate straight in the direction perpendicular to the flow direction of the reaction fluid (Y-axis direction), and the partial flow passages of the reaction flow passage 212 and the outside are locally communicated with each other. In the state where the catalyst structure 620 is loaded into the reaction flow passage 212, the position of the through-hole 640 corresponds to that of the through-hole 614 of the partition wall 612, and the length of the through-hole 640 in the flow direction (X-axis direction) and the height (Z-axis direction) as well are substantially the same as those of the through-hole 614 of the partition wall 612. Therefore, the partial flow passages of the reaction flow passage 212 and the through-hole 614 communicate with each other through the communicating passage formed by the through-hole 640 of the main body 630.

Thus, the communicating portion 650 of the partition and the communicating portion of the main body 630 can also be configured by the through-holes 614 and 640.

In the above, preferred embodiments of the present disclosure are described with reference to the accompanying drawings, and it is obvious that the present disclosure is not limited to these embodiments. It is apparent that those skilled in the art could conceive the various changes and modifications in the scope described in the claims, and it is understood that these are also within the scope of the present disclosure naturally.

For example, although the configurations where the communicating portion 350, 450, 550, or 650 of the partition is formed in one place are described in the above embodiments and modifications, the number of the place where the communicating portion 350, 450, 550, or 650 is provided is not limited and it may be two or more. In other words, there may be a plurality of gaps 230, cutouts 514, 540, or through-holes 614 in one partition wall 112, 512, and 612.

In addition, in the embodiment of FIGS. 2A to 2C, the gap 230 of the partition wall 112 constituting the communicating portion 350 and the gap 330 of the main body 310 are formed so that they are substantially the same in the size and the position in the flow direction (X-axis direction). However, the sizes and the positions of the gaps 230 and 330 can be different as long as the partial flow passages of the reaction flow passage 212 and the gap 230 communicate with each other. In other words, the gap 230 of the partition wall 112 and the gap 330 of the main body 310 may be formed so as to overlap with each other at least partially. In this regard, the same is true in the modification of FIGS. 4A to 6B, and the gap 230, the cutout 514 or the through-hole 640 of the partition walls 112, 512, and 612 and the cutout 430 or 540 or the through-hole 640 of the main bodies 410, 530, and 630 can also be formed so that they are different in the size or the position in the flow direction.

Moreover, in the above embodiments and modifications, where the communicating portion 350, 450, 550, or 650 of the partition and the communicating portion in the main body 310, 410, 530, or 630 of the catalyst structure 300, 400, 520, or 620 are constituted by either one of the forms of the gap, the cutout, and the through-hole, the combination of the forms of constituting the communicating portions is not limited to the combination described in FIGS. 2A to 2C and FIGS. 4A to 6B, and the combination can be appropriately changed. For example, in FIGS. 4A and 4B, the main body 410 of the catalyst structure 400 may be formed with the through-hole 640 in FIGS. 6A and 6B instead of the cutouts 430, or the catalyst structure 520 or 620 in FIGS. 5A and 5B or FIGS. 6A and 6B may be changed to the catalyst structure 300 in FIGS. 2A to 2C so that at least one of the communicating portions is constituted by the gap. Alternatively, the communicating portion may be configured by forming a cutout in one of the partition wall and the main body of the catalyst structure, and forming a through-hole in the other.

In addition, although the above embodiments and modifications are configured to provide the communicating portion 350, 450, 550, or 650 in the partition of the reaction flow passage group 210, they may be changed to provide such a communicating portion also in the partition of the heating medium flow passage group 220. This change effectively acts to reduce temperature difference, for example, in the case where the temperature difference is produced among the heating medium flow passages 222 due to occurrence of the coking or the blockage in the reaction flow passages 212, and the like.

In addition, although the above-described embodiments are described as the examples where the reaction fluid flowing through the reaction flow passages 212 and the heating medium flowing through the heating medium flow passages 222 are in a relationship of counter-flow, the reaction fluid and the heating medium may be in a relationship of parallel flow.

Moreover, although the above-described embodiments are described as a reactor where the heating medium flowing through the heating medium flow passage group 220 is gas, the present disclosure is also applicable to reactors where the heating medium is liquid.

In addition, the above-described embodiment is described as a reactor 100 including the heating medium flow passage group 220. However, the disclosed technology relates to the configuration of the communicating portion provided in the reaction flow passage group 210, and the present disclosure is thus applicable to reactors where the heating medium flow passage group 220 is not configured. Therefore, the reactor according to the present disclosure does not have to include the configuration of the heating medium flow passage group 220. That is, the configuration may be changed to provide a heater for heating the reaction fluid or a cooler for cooling the reaction fluid on the heat transfer plate, instead of the configuration of the heating medium flow passage group 220, so as to heat or cool the reaction fluid from the outside of the reaction flow passage 212 by using it.

In addition, although the above-described embodiment is described as a reactor having a stacked structure where the reaction flow passage group 210 and the heating medium flow passage group 220 are alternately stacked, it may be a reactor having a single layer structure having only one layer constituting the reaction flow passage group 210 and doesn't have to have a stacked structure.

The disclosed technology can be applied to a reactor configured to accelerate the reaction by causing the catalyst to act on the reaction fluid including the reactant, to provide a reactor capable of reducing the replacement frequency of the catalyst and the maintenance costs.

What is claimed is:

1. A reactor in which a catalyst to accelerate reaction of a reactant is allowed to act on a reaction fluid having a reactant, the reactor comprising:
    a partition that defines a layered space between a plurality of heat transfer walls into a plurality of reaction flow passages in a parallel form, through which the reaction fluid flows; and
    a plurality of catalyst structures, each having the catalyst and being respectively loaded in each of the plurality of reaction flow passages;
    wherein each of the plurality of catalyst structures includes a main body made of a thin plate material on which the catalyst is supported, the partition has a communicating portion allowing the plurality of reaction flow passages to communicate with each other, and the communicating portion is arranged in a location closer to inlet side branch points than to outlet side branch points of the reaction flow passages within a range where the reaction fluid branches to flow, and
    wherein the main body of each of the plurality of catalyst structures divides the reaction flow passage along the flow direction of the reaction fluid and defines a plurality of partial flow passages in parallel, and the main body has a communicating portion allowing the plurality of partial flow passages to communicate with each other in correspondence with the communicating portion of the partition.

2. The reactor according to claim 1, wherein the communicating portion of the partition is arranged so that the plurality of reaction flow passages communicate with each other in a direction perpendicular to a flow direction of the reaction fluid, and the reaction fluid flowing through the plurality of reaction flow passages is redistributed in the middle in the communication portion.

3. The reactor according to claim 1, wherein the partition includes one or a plurality of partition walls extending along a flow direction of the reaction fluid, the partition wall is configured to include at least two partial partition walls arranged apart from each other so as to have a gap therebetween, and the communicating portion of the partition has the gap of the partition wall.

4. The reactor according to claim 1, wherein the partition includes one or a plurality of partition walls extending along a flow direction of the reaction fluid, and the communicating portion of the partition has a cutout provided in the partition wall.

5. The reactor according to claim 1, wherein the partition includes one or a plurality of partition walls extending along a flow direction of the reaction fluid, and the communicating portion of the partition has a through-hole provided in the partition wall.

6. The reactor according to claim 1, wherein the main body is configured to include at least two portions arranged apart from each other so as to have a gap therebetween, and the communicating portion of the main body has the gap of the main body.

7. The reactor according to claim 1, wherein the communicating portion of the main body has a cutout provided in the main body.

8. The reactor according to claim 1, wherein the communicating portion of the main body has a through-hole provided in the main body.

9. The reactor according to claim 1, wherein the thin plate material constituting the main body is bent in such a manner to form one or more parallel grooves and ridges, and defines each of the plurality of partial flow passages so as to have a rectangular cross section being perpendicular to the flow direction of the reaction fluid, and
    the communicating portion of the main body has a cutout provided in at least one of a part forming the groove and a part forming the ridge of the thin plate material.

10. The reactor according to claim 1, wherein the plurality of catalyst structures are respectively replaceable.

11. The reactor according to claim 1, further comprising:
    another partition that defines another layered space between the plurality of heat transfer walls into a plurality of heating medium flow passages in a parallel form, through which a heating medium flows.

* * * * *